US007803303B2

(12) United States Patent
Hagg

(10) Patent No.: US 7,803,303 B2
(45) Date of Patent: Sep. 28, 2010

(54) METHODS AND APPARATUS FOR PLUGGING HONEYCOMB STRUCTURES

(75) Inventor: Ralph Henry Hagg, Corning, NY (US)

(73) Assignee: Corning Incorporated, Corning, NY (US)

( * ) Notice: Subject to any disclaimer, the term of this patent is extended or adjusted under 35 U.S.C. 154(b) by 173 days.

(21) Appl. No.: 11/998,327

(22) Filed: Nov. 29, 2007

(65) Prior Publication Data

US 2009/0140453 A1 Jun. 4, 2009

(51) Int. Cl.
*B01D 39/20* (2006.01)
*B29C 47/02* (2006.01)
*C04B 35/478* (2006.01)
*B29C 67/20* (2006.01)
*C04B 33/32* (2006.01)

(52) U.S. Cl. .................. 264/267; 264/177.12; 264/630; 264/261; 425/113; 425/129.1

(58) Field of Classification Search ............ 264/177.12, 264/259, 261, 267, 630; 425/113, 129.1, 425/110, 127
See application file for complete search history.

(56) References Cited

U.S. PATENT DOCUMENTS 3,836,302 A * 9/1974 Kaukeinen .................. 425/197
3,885,977 A 5/1975 Lachman et al. .............. 106/62
3,947,214 A * 3/1976 Cunningham ............... 425/467
3,983,283 A * 9/1976 Bagley ....................... 428/116
4,008,033 A * 2/1977 Folmar et al. ............... 425/467
4,297,140 A 10/1981 Paisley ....................... 428/310
4,329,162 A 5/1982 Pitcher, Jr. ................... 55/523
4,557,773 A * 12/1985 Bonzo ......................... 156/64
4,759,892 A * 7/1988 Bonzo ......................... 264/251
4,812,276 A * 3/1989 Chao ...................... 264/177.11
4,915,612 A * 4/1990 Gangeme et al. ............ 425/464
5,258,150 A 11/1993 Merkel et al. ................. 264/43
5,811,048 A * 9/1998 Dunn et al. ............ 264/177.11
RE38,888 E 11/2005 Beall et al. .................. 501/119
2002/0098320 A1* 7/2002 Beall et al. .................. 428/116
2003/0160366 A1 8/2003 Fukuta et al. .................. 33/32
2004/0029707 A1 2/2004 Beall et al. .................. 501/119
2004/0261384 A1 12/2004 Merkel et al. ................. 55/523
2005/0046072 A1* 3/2005 Shalkey ...................... 264/169
2005/0120691 A1 6/2005 Miwa .............................. 39/6
2006/0103057 A1 5/2006 Kouketsu ....................... 33/32
2007/0026188 A1* 2/2007 Bookbinder et al. .......... 428/73
2008/0079194 A1* 4/2008 Kumagae et al. ............ 264/259

FOREIGN PATENT DOCUMENTS

EP 0 380 232 7/1996

* cited by examiner

*Primary Examiner*—Joseph S Del Sole
*Assistant Examiner*—Nahida Sultana
(74) *Attorney, Agent, or Firm*—Joseph M. Homa

(57) ABSTRACT

A plugging apparatus for plugging channels in a honeycomb structure used to form a particulate filter. The apparatus includes an extrusion apparatus that holds plugging material and that has an opening through which the plugging material is extruded. An extrusion plate having first through holes that correspond in location to a subset of honeycomb channels is arranged adjacent the opening. An annular flow plate is operatively arranged face-to-face with the extrusion plate. The annular flow plate has second through holes corresponding in location to the first through holes but that are smaller to compensate for a radial variation in the extrusion rate when plugging the channels in the honeycomb structure. The plugging apparatus is thus able to fill select channel ends with same-size plugs, which leads to a better-performing filter.

15 Claims, 7 Drawing Sheets

METHODS AND APPARATUS FOR PLUGGING HONEYCOMB STRUCTURES

FIELD

The present invention relates to the charging of flowable materials into selected cells of a honeycomb structure, and more particularly to methods and apparatus for selectively plugging cells of a honeycomb structure with uniformly sized plugs in the fabrication of ceramic filter bodies and other selectively sealed honeycomb structures.

BACKGROUND

Honeycomb structures such as those used in wall flow particulate filter applications require selected cells of the structure to be sealed or plugged at one or both of the respective ends thereof.

SUMMARY

In one aspect, an method is disclosed herein of inserting plugging material into a honeycomb structure comprised of a plurality of walls defining a plurality of cells, the method comprising: placing a container proximate the honeycomb structure, the container containing a charge of the plugging material; discharging from the container a discharge of the plugging material comprised of at least a portion of the charge; and passing the discharge through an extrusion mask and through a flow restrictor disposed adjacent the extrusion mask, wherein the flow restrictor restricts flow of an outer portion of the discharge more than an inner portion of the discharge, wherein the discharge is divided into a plurality of slugs of the plugging material, and the slugs are injected into respective cells of the honeycomb structure to form shots of the plugging material in the respective cells. The container can be an ejector comprising a cylinder and a piston disposed in the cylinder, wherein the piston and the cylinder define the cavity, wherein the cylinder comprises an inner surface having an inner cylinder diameter, wherein the ejector has an exit opening having an exit diameter, wherein the exit diameter is smaller than the inner cylinder diameter, and wherein the piston is capable of pushing the charge of plugging material out of the exit diameter. The extrusion mask can comprise an extrusion plate disposed at the exit opening, the extrusion plate being provided with a plurality of extrusion holes, wherein the plugging material is capable of flowing through the extrusion holes. The flow restrictor can be an annular flow restrictor disposed adjacent the extrusion plate, the annular flow restrictor being comprised of an annular plate provided with a plurality of restrictor holes, the annular plate having an inner annular edge defining a central opening, the inner annular edge having an inner annular diameter radius $R_I$, and the restrictor holes being smaller than the extrusion holes. In some embodiments, the annular flow restrictor is interposed between the extrusion plate and the honeycomb structure. In some embodiments, at least some of the restrictor holes are axially aligned with corresponding extrusion holes. In some embodiments, the annular flow restrictor has a radial length $R_A$ and the honeycomb structure has an outer radius $R_C$, and wherein $R_I<R_C$. In some embodiments, $R_A>2.5$ cm. In some embodiments, 2.5 cm$<R_A<$6.5 cm. In some embodiments, $R_C>12$ cm. In some embodiments, 12 cm$<R_C<$31 cm. In some embodiments, 2.5 cm$<R_A<$6.5 cm and 12 cm$<R_A<$31 cm. In some embodiments, $R_C$ is greater than 12 cm by a radial length $\Delta R_C$, in cm, wherein the annular portion of the flow diverter has a radial length $R_A$, and wherein $R_A \geqq 2.5+(0.16)(\Delta R_C)$, in cm.

In another aspect, an apparatus is disclosed herein for injecting plugging material into a honeycomb structure comprised of a plurality of walls defining a plurality of cells, the apparatus comprising an ejector, the ejector comprising a cylinder, a piston, an extrusion plate, and an annular flow restrictor. The cylinder comprises a cylinder housing having an exit opening with an exit diameter, the cylinder comprising an inner surface having an inner cylinder diameter. The piston is disposed in the cylinder, wherein the piston and the cylinder define a cavity configured to hold a charge of the plugging material, wherein the exit opening is open to the cavity, the exit diameter is smaller than the inner cylinder diameter, and the piston is capable of pushing the charge of plugging material out of the cylinder housing through the exit diameter. The extrusion plate is disposed at the exit opening, the extrusion plate being provided with a plurality of extrusion holes, wherein the plugging material is capable of flowing through the extrusion holes. The annular flow restrictor is disposed adjacent the extrusion plate, the annular flow restrictor comprising an annular plate provided with a plurality of restrictor holes, wherein the annular plate has an inner annular edge defining a central opening, the inner annular edge has an inner annular diameter radius $R_I$, and the restrictor holes are smaller than the extrusion holes. In some embodiments, the annular flow restrictor is interposed between the extrusion plate and the honeycomb structure. In some embodiments, at least some of the restrictor holes are axially aligned with corresponding extrusion holes. In some embodiments, the annular flow restrictor has a radial length $R_A$ and the honeycomb structure has an outer radius $R_C$, and wherein $R_I<R_C$. In some embodiments, $R_A>2.5$ cm. In some embodiments, $R_C>12$ cm. In some embodiments, 2.5 cm$<R_A<$6.5 cm and 12 cm$<R_A<$31 cm. In some embodiments, $R_C$ is greater than 12 cm by a radial length $\Delta R_C$, in cm, wherein the annular portion of the flow diverter has a radial length $R_A$, and wherein $R_A \geqq 2.5+(0.16)(\Delta R_C)$, in cm.

These and other advantages of the invention will be further understood and appreciated by those skilled in the art by reference to the following written specification, claims and appended drawings.

DETAILED DESCRIPTION

Figure 1:
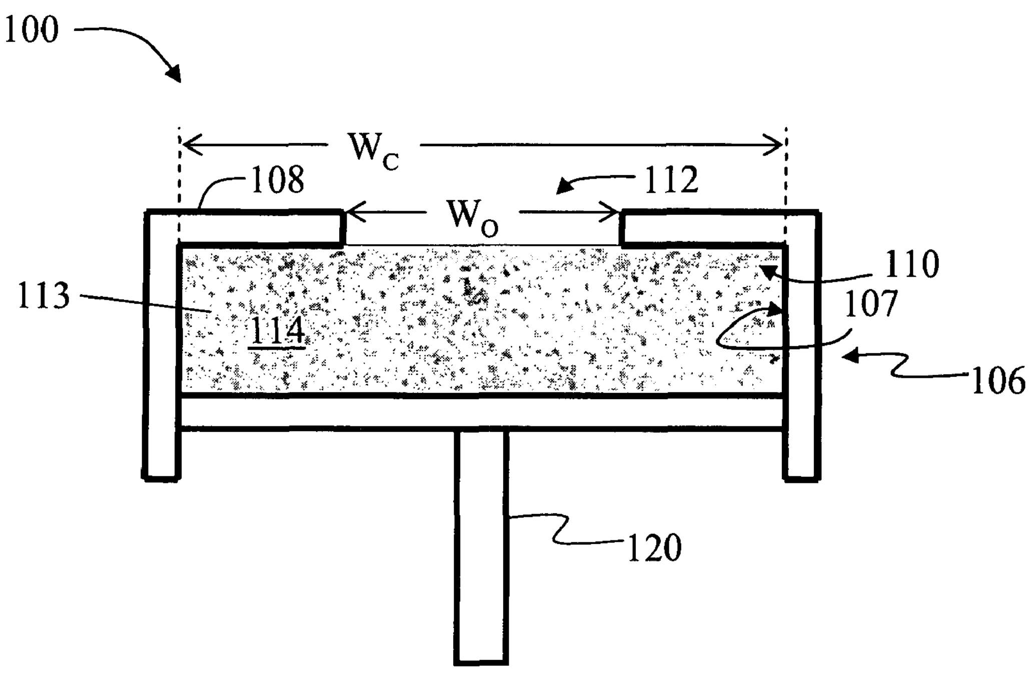
FIG. 1 is a schematic cut-away side view of an example piston-based extrusion apparatus that holds plugging material.

Reference is now made in detail to the present preferred embodiments of the invention, examples of which are illustrated in the accompanying drawings. Whenever possible, the same reference numbers and symbols are used throughout the drawings to refer to the same or like parts.

In one aspect, a method is disclosed herein of injecting plugging material into a honeycomb structure comprised of a plurality of walls defining a plurality of cells, the method comprising: placing a container proximate the honeycomb structure, the container containing a charge of the plugging material; and discharging from the container a discharge of the plugging material comprised of at least a portion of the charge, the discharge being in the form of a plurality of slugs of the plugging material, sufficient to insert at least a portion of respective slugs into respective cells of the honeycomb structure to form shots of the plugging material inserted in the respective cells. Preferably, the slugs are parallel to one another. Preferably, a flow of the plugging material out of the container comprises an inner portion and an outer portion, and the outer portion of the flow is restricted more than the inner portion. In some embodiments, the plurality of slugs is comprised of an inner portion and an outer portion of slugs, wherein, in a plane transverse to the cells, the outer portion is disposed outwardly of the inner portion; in some embodiments, the outer portion surrounds the inner portion; in some embodiments, the slugs in the outer portion pass through a flow restrictor prior to being inserted into the cells of the honeycomb structure, and the slugs in the inner portion do not pass through the flow restrictor. In some embodiments, the container is an ejector comprising a cylinder and a piston disposed in the cylinder, wherein the piston and the cylinder define the cavity, wherein the cylinder comprises an inner surface having an inner cylinder diameter, wherein the ejector has an exit opening having an exit diameter, wherein the exit diameter is smaller than the inner cylinder diameter, and wherein the piston is capable of pushing the charge of plugging material out of the exit diameter; preferably, the ejector further comprises an extrusion plate disposed at the exit opening, the extrusion plate being provided with a plurality of extrusion holes, wherein the plugging material is capable of flowing through the extrusion holes. Preferably, the extrusion plate is rigid, and in some embodiments, the extrusion plate is comprised of metal. The ejector further preferably comprises an annular flow restrictor disposed adjacent the extrusion plate, the annular flow restrictor being comprised of an annular plate provided with a plurality of restrictor holes, the annular plate having an inner annular edge defining a central opening, the inner annular edge having an inner annular diameter radius $R_I$, and wherein the restrictor holes are smaller than the extrusion holes. Preferably, the flow restrictor is rigid, and in some embodiments, the flow restrictor is comprised of metal. In some embodiments, the annular flow restrictor is interposed between the extrusion plate and the honeycomb structure. Preferably, at least some of the restrictor holes are axially aligned with corresponding extrusion holes. In some embodiments, the annular flow restrictor has a radial length $R_A$ and the honeycomb structure has an outer radius $R_C$, and wherein $R_I<R_C$; in some embodiments, $R_A>2.5$ cm; in some embodiments, 2.5 cm$<R_A<$6.5 cm; in some embodiments, $R_C>12$ cm; in some embodiments, 12 cm$<R_C<$31 cm; in some embodiments, 2.5 cm$<R_A<$6.5 cm and 12 cm$<R_A<$31 cm; and in some embodiments, $R_C$ is greater than 12 cm by a radial length $\Delta R_C$, in cm, wherein the annular portion of the flow diverter has a radial length $R_A$, and wherein $R_A \geqq 2.5+(0.16)(\Delta R_C)$, in cm. The method further preferably comprises heating the shots sufficient to bond the shots to the walls of the honeycomb structure, i.e. to seal the respective channels by forming the shots into plugs. That is, the method further preferably comprises heating the shots sufficient to cause the shots to seal the respective cells; in some embodiments, the shots form plugs as the shots are dried; in some embodiments, the shots form into ceramic plugs during the heating.

In another aspect, an apparatus is disclosed herein for injecting plugging material into a honeycomb structure comprised of a plurality of walls defining a plurality of cells, the apparatus comprising an ejector comprising: a cylinder housing having an exit opening with an exit diameter, the cylinder comprising an inner surface having an inner cylinder diameter; a piston disposed in the cylinder, wherein the piston and the cylinder define a cavity configured to hold a charge of the plugging material, wherein the exit opening is open to the cavity, the exit diameter is smaller than the inner cylinder diameter, and the piston is capable of pushing the charge of plugging material out of the cylinder housing through the exit diameter; an extrusion plate disposed at the exit opening, the extrusion plate being provided with a plurality of extrusion holes, wherein the plugging material is capable of flowing through the extrusion holes; and an annular flow restrictor disposed adjacent the extrusion plate, the annular flow restrictor comprising an annular plate provided with a plurality of restrictor holes, wherein the annular plate has an inner annular edge defining a central opening, the inner annular edge has an inner annular diameter radius $R_I$, and the restrictor holes are smaller than the extrusion holes. In some embodiments, the annular flow restrictor is interposed between the extrusion plate and the honeycomb structure. In some embodiments, at least some of the restrictor holes are axially aligned with corresponding extrusion holes; in some of these embodiments, all of the restrictor holes are axially aligned with corresponding extrusion holes. In some embodiments, the annular flow restrictor has a radial length $R_A$ and the honeycomb structure has an outer radius $R_C$, and wherein $R_I<R_C$. In some embodiments, $R_A>2.5$ cm. In some embodiments, 2.5 cm$<R_A<$6.5 cm. In some embodiments, $R_C>12$ cm. In some embodiments, 12 cm$<R_C<$31 cm. In some embodiments, 2.5 cm$<R_A<$6.5 cm and 12 cm$<R_A<$31 cm. In some embodiments, $R_C$ is greater than 12 cm by a radial length $\Delta R_C$, in cm, wherein the annular portion of the flow diverter has a radial length $R_A$, and wherein $R_A \geqq 2.5+(0.16)(\Delta R_C)$, in cm. Preferably, the flow diverter is rigid; in some embodiments, the flow diverter is comprised of metal.

In another aspect, an apparatus is disclosed herein for plugging, via extrusion of a plugging material, a subset of cells of a honeycomb structure having inner and outer portions, so as to form plugs in the subset of cells of substantially equal length in both the inner and outer portions, comprising: an extrusion plate having opposing front and back faces and a plurality of first feedholes that correspond in number and location to the subset of cells; a flow plate having a central aperture and an annular section corresponding to the outer portion of the honeycomb structure and having a plurality of second feedholes smaller in size than said first feedholes and corresponding in number and location to the subset of cells residing in the outer portion, the flow plate being arranged immediately adjacent one of the extrusion plate faces so as to align the first and second feedholes; and an extrusion apparatus configured to hold the extrusion plate and flow plate together and in an operative relationship to the honeycomb structure, the apparatus being operative to force the plugging material through the extrusion plate and the flow plate so that the plugging material that fills the subset of cells in the structure's inner portion passes only through the first feedholes and the flow plate central aperture, while the plugging material that fills the subset of cells in the structure's outer portion passes through both the first and second feedholes. In some embodiments, the flow plate annular section has an annular radius $R_A$, wherein 2.54 cm (1")<$R_A$<6.35 cm (2.5"). In some embodiments, the flow plate central aperture has a radius $R_I$, wherein 12.7 cm (5")<$R_I$<30.5 cm (12"). In some embodiments, the flow plate and the extrusion plate each have respective outer edges, and the extrusion apparatus comprises a plug ring arranged around said outer edges so as to fix the flow plate and extrusion plate to the extrusion apparatus. In some embodiments, the first feedholes are uniform in size. In some embodiments, the second feedholes are uniform in size. In some embodiments, the first feedholes are 0.635 cm (0.25") in diameter, while the second feedholes are 0.508 cm (0.20") in diameter. In some embodiments, the first feedholes are at least 10% diametrically smaller than the second feedholes. In some embodiments, the plugger assembly includes a feed cavity that holds the plugging material, and wherein the feed cavity has a cavity width and an opening through which the plugging material is extruded, and wherein the opening has a width smaller than the cavity width; in some embodiments, the extrusion apparatus includes a piston operable to force the plugging material held in the feed cavity through the first and/or the first and second feedholes. In some embodiments, the plugging material includes a ceramic paste.

In another aspect, a method is disclosed herein of plugging a subset of cells of a honeycomb structure having inner and outer portions, comprising: (a) filling those cells in the structure's inner portion by extruding plugging material through a first set of uniformly sized feedholes; and (b) filling those cells in the structure's outer portion by extruding plugging material through said first set of feedholes corresponding to said outer portion and through a second set of feedholes corresponding in location and number to the first set of feedholes at said outer portion, wherein the feed holes in the second set of feedholes are smaller than the first set of feedholes. In some embodiments, the method further comprises: providing the first feedholes in an extrusion plate; and providing the second set of feedholes in an annular flow plate having a central aperture and arranged immediately adjacent the extrusion plate such that the first and second feedholes are aligned. In some embodiments, the method further comprises performing said extruding of plugging material with an extrusion apparatus adapted to hold the plugging material in a chamber and being operative to extrude the plugging material out of the chamber and through the extrusion plate and the flow plate; in some embodiments, the method further comprises extruding said plugging material through the extrusion plate and the flow plate using a piston; in some embodiments, the method further comprises interfacing an end of the honeycomb structure with the extrusion plate and flow plate and aligning select cells to the flow plate and extrusion plate through holes prior to extruding the plugging material with the piston. In some embodiments, the method further comprises repeating steps a) and b) for a second subset of cells at an unplugged end of the honeycomb structure. In some embodiments, the method further comprises sizing the second feedholes to compensate for a variation in extrusion rates of the plugging material between the inner and outer portions of the honeycomb structure.

In another aspect, a plugging apparatus is disclosed herein for plugging a subset of cells at an end of a honeycomb structure having inner and outer regions, the apparatus comprising: a feed chamber having a feed cavity that holds plugging material, the feed cavity having an open end through which the plugging material is extruded by a piston when the piston is engaged; an extrusion plate arranged adjacent the feed cavity open end and having a plurality of uniformly sized first feedholes corresponding in location and number to the subset of cells; a flow plate arranged immediately adjacent the extrusion plate and having a central aperture with a central radius and an annular section having an annular radius with a plurality of second feedholes corresponding in location and number to corresponding cells in the subset of cells, wherein the second feedholes are smaller than the first feedholes; and wherein the extrusion plate and flow plate are arranged so that the first and second feedholes are aligned so that when the honeycomb structure end is arranged at the cavity open end and the piston is engaged, those cells in the inner region are filled with plugging material that passes through the first feedholes and the flow plate central aperture, and those cells in the outer region are filled with plugging material that passes through the first and second feedholes. In some embodiments, the flow plate central radius is between 12.7 cm (5") and 30.5 cm (12") and, and the flow plate annular radius is between 2.54 cm (1") and 6.35 cm (2.5"). In some embodiments, the second feedholes are sized to compensate for a variation in extrusion rates between the inner and outer portions of the honeycomb structure. In some embodiments, the second feedholes are uniform in size.

FIG. 1 is a schematic diagram of an example of a container 100 which is in the form of a piston-based extrusion apparatus or ejector. Ejector 100 comprises a piston 120 and cylinder 106. Cylinder 106 comprises flange 108 having an exit diameter $W_O$. The top of the head of the piston 120 and the inner surfaces of cylinder 106 (including inner surfaces of flange 108) define a feed cavity 110 having a cavity width $W_C$. The cavity 110 is provided with opening 112 having width WO. Feed cavity 110 holds a charge 113 of plugging material 114. A movable piston 120 forms a back wall of the feed cavity opposite opening 112. For an apparatus as depicted in FIG. 1, radial variations in delivered slugs of plugging material (resulting in radial plug length variations in a honeycomb body) tend to occur when the cavity opening (exit diameter $W_O$) is smaller than the feed cavity width, i.e. inner cylinder diameter $W_C$, i.e. where the exit diameter $W_O$ of the cavity 110 is smaller than the working inner cylinder diameter $W_C$ in which the head of the piston 120 slides.

Figure 2:
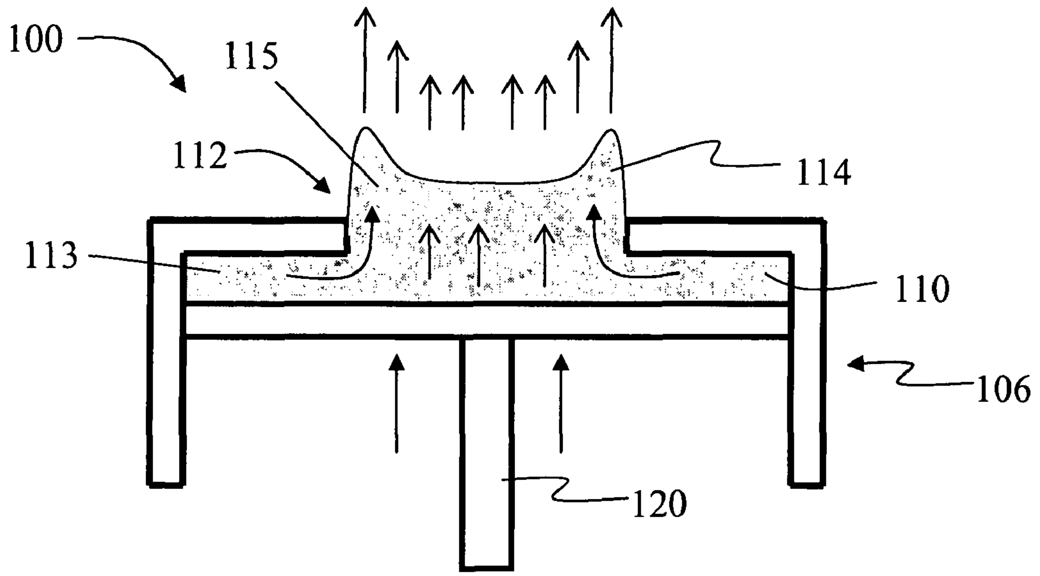
FIG. 2 is the same as FIG. 1, but showing the uneven flow of plugging material from the chamber opening, which results in uneven plug lengths in the filter body.
Figure 3:
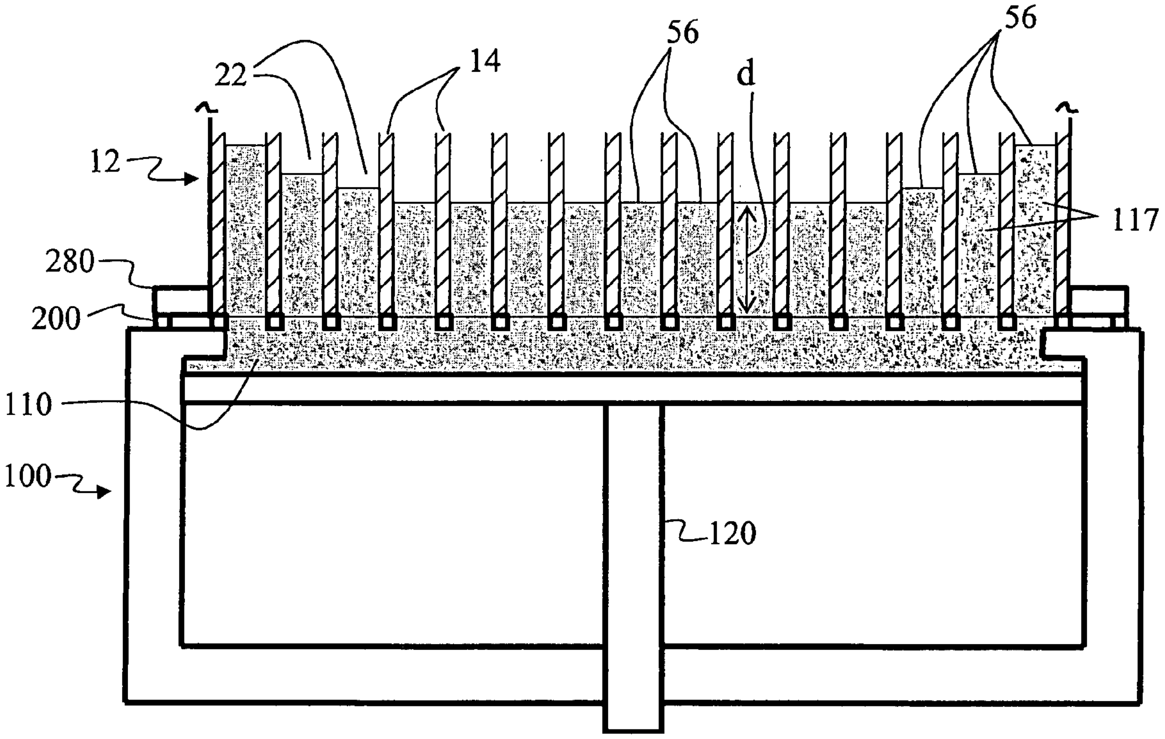
FIG. 3 is a schematic side cross-sectional view of a plugging apparatus with an extrusion plate and a flow plate.

With reference now to FIG. 2, when piston 120 is engaged to extrude plugging material 114 through exit opening 112 and into the honeycomb body (not shown), the discharge flow 115 of plugging material through the opening (i.e. the plugging material that has exited beyond the flange 108 of the cylinder 106) can be greater proximate the edges of the opening 112 than at the center of the opening, so that, referring to FIG. 3, the discharge flow 115 is divided into a plurality of parallel slugs 117 by an extrusion plate 200 that has through holes extending substantially across the width of the discharge flow 115 results in longer shots 56 of plugging material being inserted in an outer portion of the honeycomb body than in the inner portion of the honeycomb body, as illustrated in FIG. 3, however plugs preferably have substantially the same length (depth).

Figure 4:
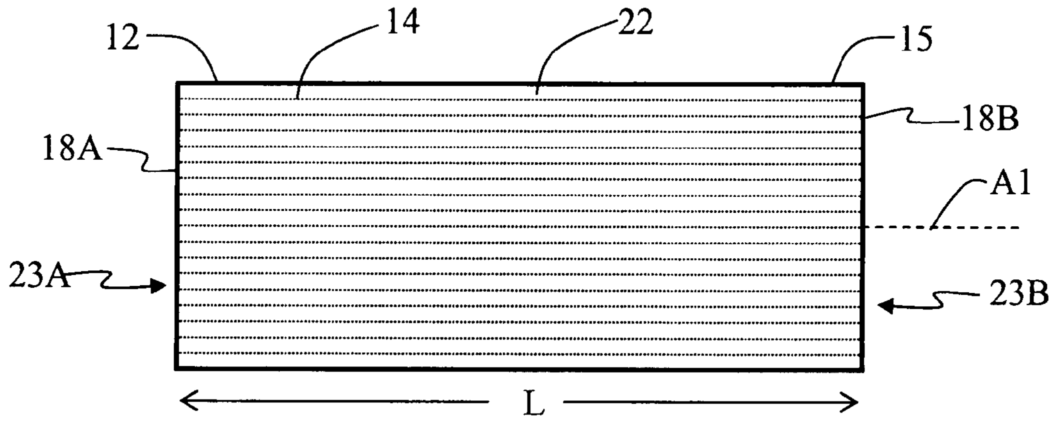
FIG. 4 is a side view of an extruded honeycomb structure suitable for use as a filter body, wherein the honeycomb structure includes a plurality of open-ended cell channels shown in phantom.

FIG. 4 is a side view representation of a honeycomb body 12 having an axis A1 in the axial direction of the cells, and an overall axial length L. Radial dimensions are perpendicular to axis A1. Honeycomb structure 12 comprises a matrix of intersecting, thin, porous walls 14 surrounded by an outer wall (or skin) 15. Walls 14 extend across and between opposing end faces 18A and 18B, and form a large number of adjoining hollow passages or cells or cell channels 22 that also extend between, and are open at, end faces 18A and 18B. Each cell channel 22 has a channel end 23A at end face 18A and a channel end 23B at end face 18B.

Figure 5:
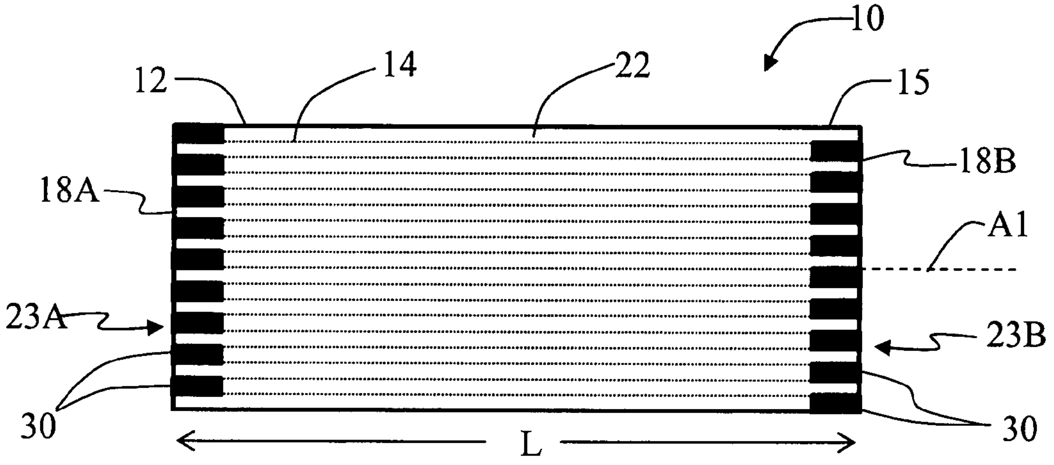
FIG. 5 is a side view of the honeycomb structure of FIG. 4, wherein first and second subsets of the cell channels are plugged at respective ends of the honeycomb structure.
Figure 6:
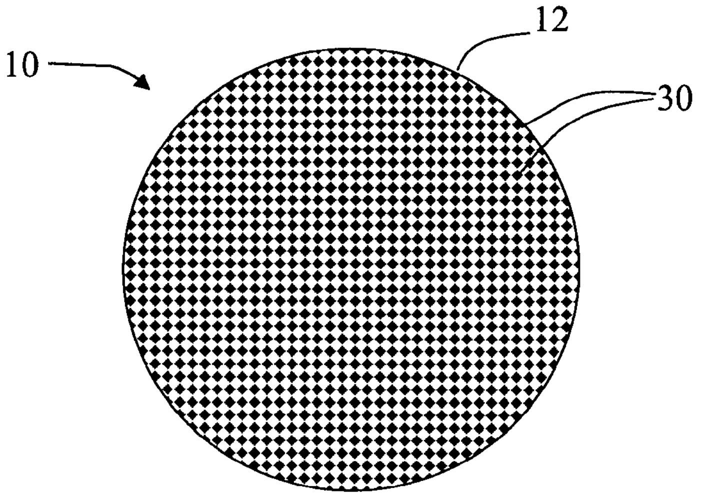
FIG. 6 is front-on view of the honeycomb structure of FIG. 5, illustrating the subset of plugged cell channels at one of the honeycomb structure ends.

To form a particulate filter 10, one channel end 23A or 23B of at least some cell channels 22 is plugged with plugs 30, for example with a first subset of the cell channels being plugged at the channel ends 23A and a second subset 26 of the channel cells being sealed at channel ends 23B. In some embodiments, either end faces 18A and 18B may be used as the inlet face of the resulting filter 10. The plugging material used to plug channel ends 23A and 23B preferably comprises a ceramic paste, such as made up of ceramic powder, water and organics. In some embodiments, the plug material may constitute about 5% by volume of the overall structure. FIG. 5 is the same side view representation of the honeycomb structure of FIG. 4, but wherein first and second subsets of the cell channels are plugged at the opposite ends of the honeycomb structure. FIG. 6 is front-on view of one end of a plugged honeycomb structure.

In the operation of an exemplary completed filter 10, contaminated fluid or gas is brought under pressure to an inlet face and enters the filter via those cells having an open end at the inlet face; because these cells are sealed at the opposite end face, i.e., the outlet face of the body, the contaminated fluid is forced through the thin porous walls 14 into adjoining cells which are sealed at the inlet face and open at the outlet face. The solid particulate contaminant in the fluid, which is too large to pass through the porous openings in the walls, is left behind and a cleansed fluid exits the filter 10 through the outlet cells.

Forming the Filter Body

Forming filter 10 involves extruding a wet ceramic precursor mixture through an extrusion die to form a wet extruded honeycomb log, cutting the wet log so formed into a plurality of pieces, and drying the segmented portions pieces to form green honeycomb bodies. The ceramic precursor mixture may comprise a batch mixture of ceramic (such as cordierite) forming inorganic precursor materials, a pore former such as graphite or starch, a binder, a lubricant, and a liquid vehicle. The batch components can be any combination of components which can, upon firing, provide a porous ceramic, for example having primary sintered phase composition (such as a primary sintered phase composition of cordierite or aluminum titanate).

In an example embodiment, the inorganic batch components can be selected from a magnesium oxide source, an alumina-forming source, and a silica source. The batch components are further selected so as to yield a ceramic article comprising predominantly cordierite, or a mixture of cordierite, mullite and/or spinel upon firing. For example, the inorganic batch components can be selected to provide a ceramic article that comprises at least about 90% by weight cordierite, or more preferably 93% by weight cordierite. In an example embodiment, the cordierite-containing honeycomb article consists essentially of, as characterized in an oxide weight percent basis, from about 49 to about 53 percent by weight $SiO_2$, from about 33 to about 38 percent by weight $Al_2O_3$, and from about 12 to about 16 percent by weight MgO. To this end, an exemplary inorganic cordierite precursor powder batch composition preferably comprises about 33 to about 41 weight percent of an aluminum oxide source, about 46 to about 53 weight percent of a silica source, and about 11 to about 17 weight percent of a magnesium oxide source. Exemplary non-limiting inorganic batch component mixtures suitable for forming cordierite are disclosed in U.S. Pat. Nos. 3,885,977; 5,258,150; US Pub. No. 2004/0261384 and 2004/0029707; and RE 38,888.

The inorganic ceramic batch components can be synthetically produced materials such as oxides, hydroxides, and the like. Alternatively, they can be naturally occurring minerals such as clays, talcs, or any combination thereof. Thus, it should be understood that the present invention is not limited to any particular types of powders or raw materials, as such can be selected depending on the properties desired in the final ceramic body.

Honeycomb structure 12 can be fired and then plugged as described below.

Plugging and Drying the Channel Ends

The step of forming plugs 30 in honeycomb structure 12 includes charging or otherwise introducing a flowable plugging cement material, such as a cement composition preferably in the form of a paste into selected cell channels 22 as determined by the plugging mask, also referred to herein as "extrusion plate."

Modified Plugging Apparatus and Method

Figure 7:
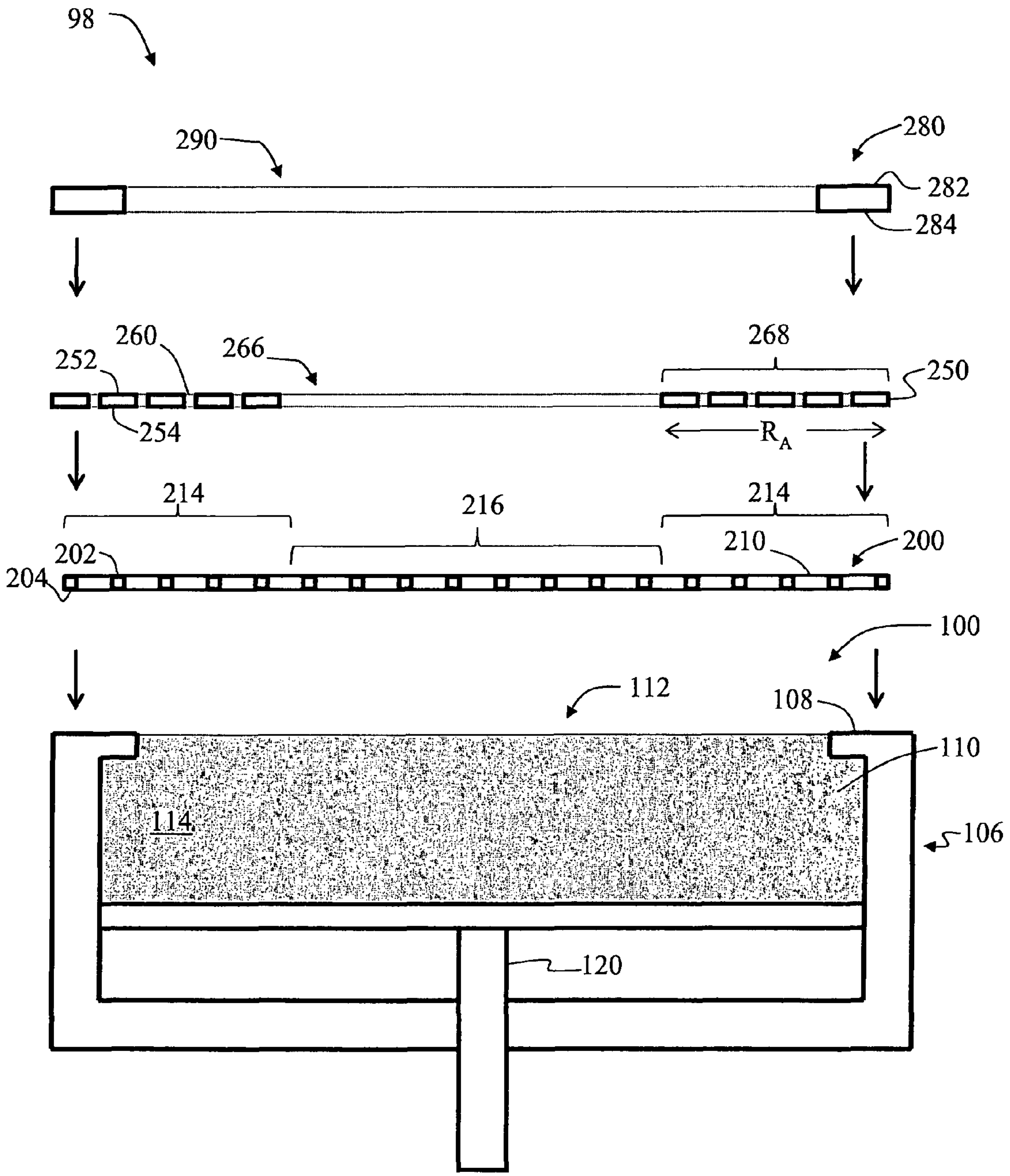
FIG. 7 is an exploded schematic side cross-sectional view of a plugging apparatus according to the present invention that includes the aforementioned extrusion apparatus, an extrusion plate, and an annular flow plate that controls the flow of extruded plug material at the outer portion of the extrusion plate.
Figure 8:
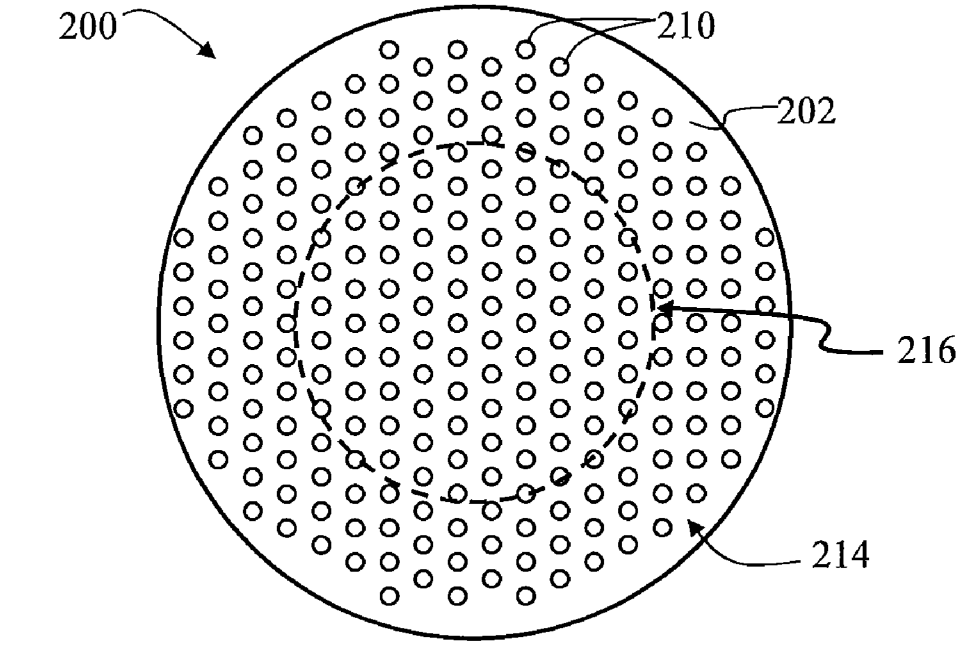
FIG. 8 is a front-on view of an example embodiment of the extrusion plate.

As described above, plugging methods based on a piston-cylinder apparatus where the exit diameter of the cavity opening is smaller than the working inner cylinder diameter in which the head of the piston slides, such piston-based plugging methods have the disadvantage of inserting unequal length shots of plugging material which leads to forming plugs of unequal length. FIG. 7 is an exploded schematic side cross-sectional view of a plugging apparatus 98 as disclosed herein that comprises a piston 120 and cylinder 106, an extrusion plate 200, and flow plate 250. FIG. 8 is a front-on view of an example embodiment of extrusion plate 200. Extrusion plate 200 has front and back surfaces 202 and 204, and an array of through-holes 210, in some embodiments equal-sized, formed therein. Through-holes 210 correspond to the location of a subset of channel ends 23A or 23B. Extrusion plate 200 can be viewed as having an outer section 214 near the plate periphery and an inner section 216 closer to the plate center. In an example embodiment, extrusion plate 200 is made of metal such as aluminum.

Figure 9:
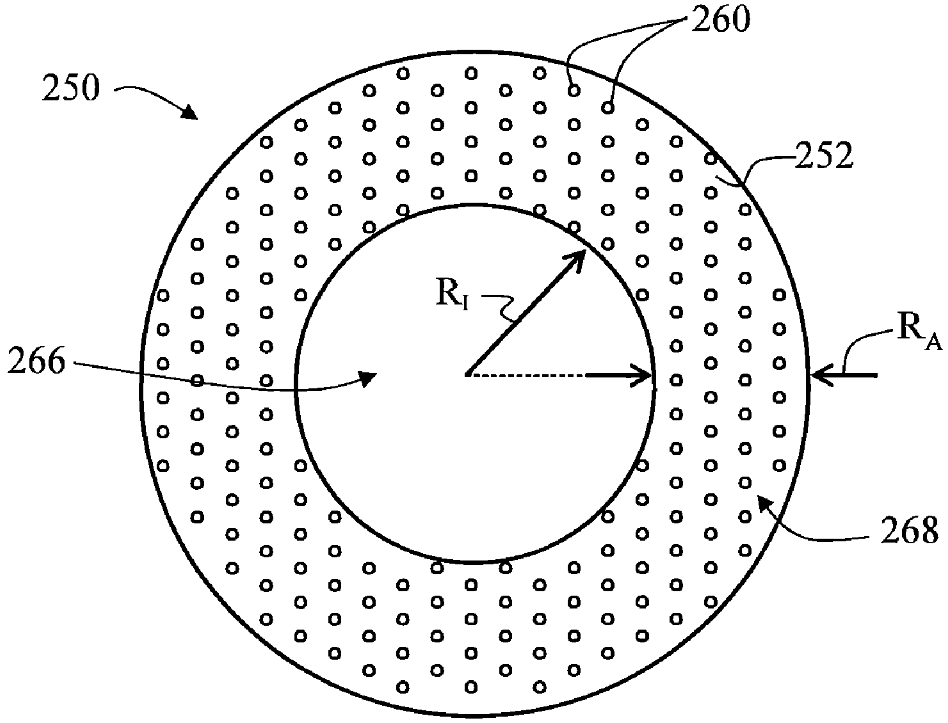
FIG. 9 is a front-on view of an example embodiment of the flow plate.
Figure 10:
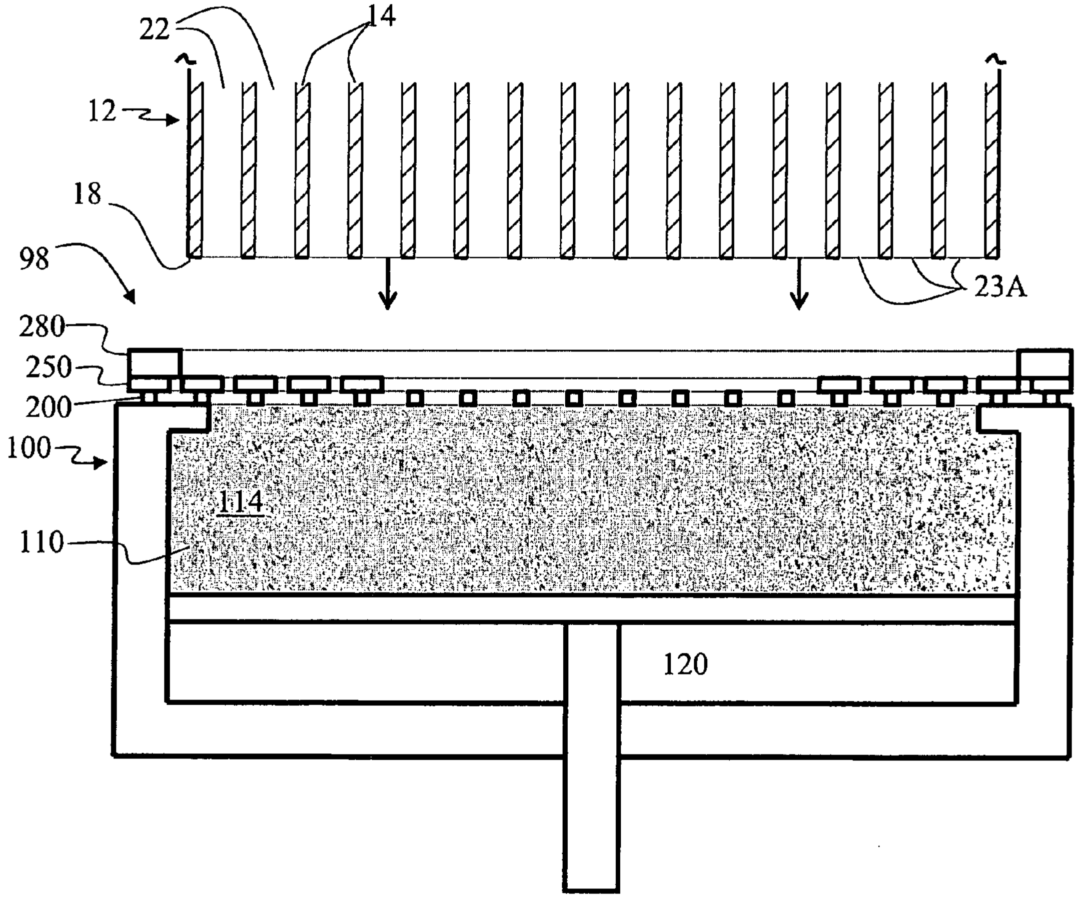
FIG. 10 is a schematic side cross-sectional view of the plugging apparatus of the present invention with the extrusion plate, the flow plate, and the retaining ring in place at the chamber top surface of the extrusion apparatus.

Annular flow plate 250 has front and back planar surfaces 252 and 254, and an array of through-holes 260, in some embodiments equal-sized. Flow plate 250 is arranged immediately adjacent extrusion plate 200, for example as shown in FIG. 10 "downstream" of the extrusion plate 200. FIG. 9 is a front-on view of an example embodiment of flow plate 250. Flow plate 250 has a central opening 266 with a radius $R_I$ and an annular section 268 that has an annular radius $R_A$. In an example embodiment, 12.7 cm (5")$<R_I<$30.5 cm (12"). Also in an example embodiment, 2.54 cm (1")$<R_A<$6.35 cm (2.5"), and in a particular example embodiment $R_A$=3.8 cm (1.5"). Flow plate 250 is preferably configured so that annular section 268 corresponds to outer section 214 of extrusion plate 200. Apparatus 98 also includes a retaining ring 280 that has front and back surfaces 282 and 284, and a central aperture 290. Retaining ring 280 is used to hold extrusion plate 200 and flow plate 250 against one another and against chamber top surface 108 so that they cover chamber opening 112.

FIG. 10 is a schematic side cross-sectional view of plugging apparatus 98 similar to FIG. 7 but showing extrusion plate 200, flow plate 250 and retaining ring 280 in place at chamber top surface 108. Preferably, the flow-plate through-holes 260 are configured to align with the extrusion plate through-holes 210 in extrusion plate outer section 214 when the two plates are interfaced in apparatus 98. Extrusion plate 200 and flow plate 250 are held in place by retaining ring 280 so as to cover chamber opening 112. FIG. 10 also shows an end portion of honeycomb structure 12 with end-face 18A being placed against flow plate front surface 252 in preparation for plugging select channel ends 23A.

Figure 11:
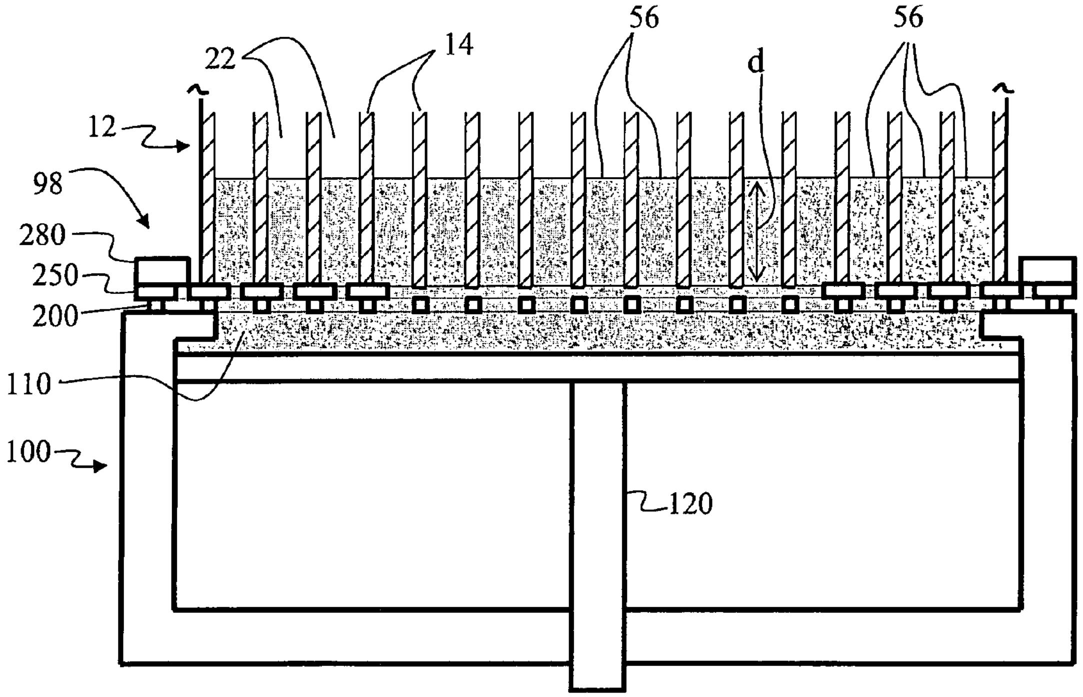
FIG. 11 is similar to FIG. 10, but with the plugging material having been extruded by the piston through the extrusion plate and the flow plate.

FIG. 11 is similar to FIG. 10, but with plugging material 114 having been extruded by piston 120 through extrusion plate 200 and flow plate 250. During the extrusion process, plugging material 114 is extruded through the through holes 210 of extrusion plate 200 and passes through central opening 266 in inner section 216 but is extruded through both the extrusion plate through holes 210 and flow plate through holes 260 in outer section 214 where the flow plate covers the extrusion plate. Because flow plate through holes 260 are smaller than extrusion plate through holes 210, the extrusion of plug material 114 associated with through holes 260 is restricted more than that associated with the extrusion plate through holes alone, which is used to compensate for the aforementioned radially differential extrusion rate wherein the plugging material 114 flow out of chamber opening 112 is greater around the edges than at the center. The flow plate 250 in conjunction with the extrusion plate 200 can provide more uniformly sized shots of plugging material inserted into channel ends 23A.

FIG. 3 illustrates the plugging material shot depth ("d") non-uniformity, and therefore plug depth non-uniformity described above that results when flow plate 250 is not used in plugging apparatus 98.

Plugging material is provided so as to have a depth d (FIG. 11), which can be between 0.5 mm to 20 mm, so as to provide proper plugging of the cell channels 22 and proper drying of the plugs 30 during the curing or drying or firing of the plugging material. Suitable plugging materials may be of the same or similar composition as the green honeycomb structure, or, for example, as described in U.S. Pat. No. 4,329,162 to Pitcher and U.S. Pat. No. 4,297,140 to Paisley.

The apparatus and methods disclosed herein can be incorporated into methods of plugging that comprises the use of a mask in the form of an extrusion plate having a number of openings extending therethrough for selectively manifolding honeycomb structures in the fabrication of solid particulate filter bodies. The mask can be used in conjunction with a cement formed into a paste by mixing ceramic raw material with an aqueous binder, such as methylcellulose, plasticizer and water. When using this cement, the cement is extruded into the ends of the cells through the extrusion plate using a servo-driven piston-based plugging apparatus. The plugs are then dried and fired for strength and adhesion. Plug length (depth) can be an important particulate filter attribute that can impact filter back-pressure, plug strength, and/or thermal profile.

It will be apparent to those skilled in the art that various modifications to the preferred embodiment of the invention as described herein can be made without departing from the spirit or scope of the invention as defined in the appended claims. Thus, it is intended that the present invention covers the modifications and variations of this invention provided they come within the scope of the appended claims and the equivalents thereto.

What is claimed is:

1. A method of inserting plugging material into a ceramic honeycomb structure comprised of a plurality of walls defining a plurality of cells, the method comprising:

placing a container proximate the honeycomb structure, the container containing a charge of the plugging material;

providing an extrusion mask provided with a plurality of extrusion holes;

providing an annular flow plate disposed directly adjacent the extrusion mask, the annular flow plate being provided with a plurality of restrictor holes which are diametrically smaller than the extrusion holes, the annular flow plate having an inner annular edge defining a central opening;

axially aligning select cells to the restrictor holes of the flow plate and the extrusion holes of the extrusion mask prior to discharging the plugging material;

discharging from the container a discharge of the plugging material comprised of at least a portion of the charge, and passing the discharge through an extrusion mask and then through the annular flow plate disposed directly adjacent the extrusion mask, wherein the annular flow plate restricts flow of an outer portion of the discharge more than an inner portion of the discharge, wherein the discharge is divided into a plurality of slugs of the plugging material, and the slugs are injected into respective cells of the honeycomb structure to form shots of the plugging material in the respective cells.

2. The method of claim 1 wherein the container is an ejector comprising a cylinder and a piston disposed in the cylinder, wherein the piston and the cylinder define the cavity, wherein the cylinder comprises an inner surface having an inner cylinder diameter, wherein the ejector has an exit opening having an exit diameter, wherein the exit diameter is smaller than the inner cylinder diameter, and wherein the piston is capable of pushing the charge of plugging material out of the exit diameter.

3. The method of claim 2 wherein the extrusion mask comprises an extrusion plate disposed at the exit opening, the extrusion plate being provided with a plurality of extrusion holes, wherein the plugging material is capable of flowing through the extrusion holes.

4. The method of claim 3 wherein the inner annular edge has an inner annular diameter radius $R_I$, and wherein the restrictor holes are smaller than the extrusion holes.

5. The method of claim 4 wherein the annular flow plate is interposed between the extrusion plate and the honeycomb structure such that the annular flow plate contacts the honeycomb structure.

6. The method of claim 4 wherein all of the restrictor holes are axially aligned with corresponding extrusion holes.

7. The method of claim 4 wherein the annular flow plate has a radial length $R_A$ and the honeycomb structure has an outer radius $R_C$, and wherein $R_I<R_C$.

8. The method of claim 7 wherein $R_A>2.5$ cm.

9. The method of claim 7 wherein 2.5 cm$<R_A<$6.5 cm.

10. The method of claim 7 wherein $R_C>12$ cm.

11. The method of claim 7 wherein 12 cm$<R_C<$31 cm.

12. The method of claim 7 wherein 2.5 cm$<R_A<$6.5 cm and 12 cm$<R_A<$31 cm.

13. The method of claim 7 wherein $R_C$ is greater than 12 cm by a radial length $\Delta R_C$, in cm, wherein the annular portion of the flow plate has a radial length $R_A$, and wherein $R_A \geqq 2.5+(0.16)(\Delta R_C)$, in cm.

14. The method of claim 1 wherein the restrictor holes and extrusion holes are aligned so that selected cells in an inner region of the honeycomb structure are injected with plugging material that passes through respective extrusion holes and the flow plate central opening, and other selected cells in an outer region of the honeycomb structure are injected with plugging material that passes through respective extrusion holes and restrictor holes.

15. The method of claim 1 wherein the shots of the plugging material in the respective cells have a depth between 0.5 mm to 20 mm.

* * * * *